(12) United States Patent
Furukawa et al.

(10) Patent No.: US 9,605,157 B2
(45) Date of Patent: Mar. 28, 2017

(54) SURFACE TREATMENT METHOD AND COATING AGENT

(71) Applicants: Yuichi Furukawa, Toyota (JP); Shuji Sotozaki, Okazaki (JP)

(72) Inventors: Yuichi Furukawa, Toyota (JP); Shuji Sotozaki, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 129 days.

(21) Appl. No.: 14/404,538

(22) PCT Filed: May 7, 2013

(86) PCT No.: PCT/IB2013/000855
§ 371 (c)(1),
(2) Date: Nov. 28, 2014

(87) PCT Pub. No.: WO2013/179111
PCT Pub. Date: Dec. 5, 2013

(65) Prior Publication Data
US 2015/0218385 A1    Aug. 6, 2015

(30) Foreign Application Priority Data

May 29, 2012 (JP) ................................ 2012-122238

(51) Int. Cl.
| | |
|---|---|
| *B05D 3/00* | (2006.01) |
| *C09D 1/00* | (2006.01) |
| *C23C 18/12* | (2006.01) |
| *B22C 9/06* | (2006.01) |
| *C23C 28/04* | (2006.01) |
| *B22C 3/00* | (2006.01) |
| *B22C 9/12* | (2006.01) |

(52) U.S. Cl.
CPC ............ *C09D 1/00* (2013.01); *B05D 3/007* (2013.01); *B22C 3/00* (2013.01); *B22C 9/061* (2013.01); *B22C 9/12* (2013.01); *C23C 18/1204* (2013.01); *C23C 18/1245* (2013.01); *C23C 18/1275* (2013.01); *C23C 18/1295* (2013.01); *C23C 28/04* (2013.01)

(58) Field of Classification Search
CPC . B05D 3/007; C23C 18/1204; C23C 18/1275; C23C 18/1295
See application file for complete search history.

(56) References Cited

U.S. PATENT DOCUMENTS

| | | | |
|---|---|---|---|
| 3,959,557 A | * | 5/1976 | Berry .................... B65H 57/08 |
| | | | 242/157 C |
| 4,765,847 A | | 8/1988 | Arai et al. |
| 5,273,782 A | | 12/1993 | Sagawa et al. |
| 6,139,624 A | | 10/2000 | Rupp |
| 2003/0022457 A1 | | 1/2003 | Gutsche et al. |
| 2007/0102776 A1 | * | 5/2007 | Pan .................. H01L 21/28088 |
| | | | 257/411 |
| 2011/0104368 A1 | | 5/2011 | Furukawa |
| 2012/0040188 A1 | | 2/2012 | Davies et al. |

FOREIGN PATENT DOCUMENTS

| | | |
|---|---|---|
| CN | 101570443 | 11/2009 |
| CN | 102356138 A | 2/2012 |
| JP | 56-111560 A | 9/1981 |
| JP | 62-40362 A | 2/1987 |
| JP | 62-70561 A | 4/1987 |
| JP | 62-70562 A | 4/1987 |
| JP | 5-302176 A | 11/1993 |
| JP | 2006-206423 A | 8/2006 |
| JP | 2007 144499 | 6/2007 |
| JP | 2008-031522 A | 2/2008 |
| JP | 2008 105082 | 5/2008 |
| JP | 4868052 | 2/2012 |

OTHER PUBLICATIONS

Gordon : Topics in Chemical Instrumentation; VI. Differential Thermal Analysis; Journal of Chemical Education, vol. 40, No. 2, Feb. 1963 14pgs.*
International Search Report Issued May 9, 2014 Filed May 7, 2013 in PCT/IB13/000855.
Office Action issued Dec. 15, 2015 in Japanese Patent Application No. 2012-122238 (submitting partial English translation only).

* cited by examiner

Primary Examiner — Nathan Empie
(74) Attorney, Agent, or Firm — Oblon, McClelland, Maier & Neustadt, L.L.P.

(57) ABSTRACT

A surface treatment method on a base material coated a surface with a carbon film includes: supplying at least any one of titanium, zirconium, niobium, vanadium, hafnium, tantalum, and tungsten to the carbon film; and heating the carbon film to 400° C. or more under an inert atmosphere, thereby forming a coating film on the base material.

11 Claims, 10 Drawing Sheets

SURFACE TREATMENT METHOD AND COATING AGENT

BACKGROUND OF THE INVENTION

1. Field of the Invention

The invention relates to a surface treatment method to be performed on a base material, and a coating agent to be applied onto the base material.

2. Description of Related Art

In order to facilitate removal of a cast product from a mold, a surface treatment is performed on the mold (see, e.g., Japanese Patent No. 4868052).

With the technology disclosed in Japanese Patent No. 4868052, fullerene is supplied to a carbon film (amorphous carbon) coating the surface of a mold. Then, the mold is put into a container storing molten metal (e.g., molten aluminum), and the mold is heated. As a result, fullerene is moved into the voids in the carbon film, so that the carbon film is densified, resulting in the reinforcement of the carbon film. The reinforced carbon film is repeatedly cast in the mold, which enables fullerene to penetrate more into the inside (the mold side). Namely, by repeatedly performing casting, it is possible to elongate the life of the mold.

With the technology disposed in Japanese Patent No. 4868052, the carbon film coats the surface of the mold, resulting in an increase in film thickness. In other words, it results that the surface of the mold is coated with a thick carbon film. Further, at the stage before repeatedly performing casting, in other words, at first or second casting, relatively much fullerene may be situated on the surface side of the carbon film. In other words, the mold side of the carbon film may not be sufficiently densified.

Thus, when the carbon film is thick, and the mold side of the carbon film is not sufficiently densified, in first or second casting, the carbon film may be peeled off from the mold.

Herein, to a mold for use, in gravity casting, low pressure die casting, or the like, a coating agent is applied before casting for the purpose of facilitating removal of a product from the mold, or other purposes. As the raw materials for such a coating agent, there are used graphite and the like having good fluidity for molten metal.

The carbon film reinforced by using the technology disclosed in Japanese Patent No. 4868052 is not so good in fluidity for molten aluminum enough to be able to be used in the powder form thereof as the raw material for the coating agent. In other words, the carbon film reinforced by using the technology disclosed in Japanese Patent No. 4868052 cannot be used as the raw material for the coating agent.

SUMMARY OF THE INVENTION

The invention provides a surface treatment method capable of suppressing the occurrence of initial peeling between a coating film and a base material, and capable of improving the fluidity for molten aluminum, and a coating agent capable of facilitating removal of a product from the base material, and capable of elongating the life of the base material.

According to a first aspect of the invention, there is provided a surface treatment method on a base material coated a surface with a carbon film. The method includes: supplying at least any one of titanium, zirconium, niobium, vanadium, hafnium, tantalum, and tungsten to the carbon film; and heating the carbon film to 400° C. or more under an inert atmosphere, thereby forming a coating film on the base material.

In the first aspect, the carbon film may be amorphous carbon.

In the first aspect, the surface treatment method may also include cooling the coating film to 200° C. or less under an inert atmosphere, after forming the coating film.

In the first aspect, the surface treatment method may also include cleaning the coating film with ultrasonic wave in an oil, after cooling the coating film.

According to a second aspect of the invention, a coating agent includes: a component of the coating film formed using the first aspect.

According to a third aspect of the invention, there is provided a surface treatment method on a base material coated a surface with a nitrogen film, with the nitrogen film coated with a carbon film. The method includes: supplying at least any one of titanium, zirconium, and niobium to the carbon film; and heating the carbon film to 400° C. or more under an inert atmosphere, thereby forming a coating film on the base material.

In the third aspect, the carbon film may be amorphous carbon.

In the third aspect, the surface treatment method may also include cooling the coating film to 200° C. or less under an inert atmosphere, after forming the coating film.

In the third aspect, the surface treatment method may also include cleaning the coating film with ultrasonic wave in an oil, after cooling the coating film.

According to a fourth aspect of the invention, a coating agent includes: a component of the coating film formed using the third aspect.

According to a fifth aspect of the invention, there is provided a surface treatment method on a base material coated a topmost surface side of a coating portion with a nitrogen film. The method includes: supplying at least any one of titanium, zirconium, and niobium to the nitrogen film; and heating the nitrogen film to 400° C. or more under an inert atmosphere, thereby forming a coating film on the base material.

In the fifth aspect, the surface treatment method may also include cooling the coating film to 200° C. or less under an inert atmosphere, after forming the coating film.

In the fifth aspect, the surface treatment method may also include cleaning the coating film with ultrasonic wave in an oil, after cooling the coating film.

According to a sixth aspect of the invention, a coating agent includes: a component of the coating film formed using the fifth aspect.

According to a seventh aspect of the invention, there is provided a surface treatment method on a base material coated a topmost surface side of a coating portion with a carbon film of amorphous carbon. The method includes: supplying a titanium-containing solution to the carbon film; and heating the carbon film to a temperature for allowing the solution to undergo a reduction reaction under an inert atmosphere, thereby forming a coating film on the base material.

In the seventh aspect, the surface treatment method may also include: performing a differential thermal analysis on a mixture of the carbon film before heating and the titanium-containing solution under an inert atmosphere; and determining a temperature region for allowing the titanium-containing solution to undergo a reduction reaction based on results of the differential thermal analysis. The temperature for allowing the titanium-containing solution to undergo a reduction reaction under the inert atmosphere may be a temperature within a range of the determined temperature region.

In the seventh aspect, the surface treatment method may also include cooling the coating film to 200° C. or less under an inert atmosphere, after forming the coating film.

In the seventh aspect, cleaning the coating film with ultrasonic wave in an oil, after cooling the coating film.

According to an eighth aspect of the invention, a coating agent includes: a component of the coating film formed using the seventh aspect.

The surface treatment methods of the first, third, fifth, and seventh aspects of the invention produce effects capable of suppressing the occurrence of initial peeling between the coating film and the base material, and capable of improving the fluidity for molten aluminum. Further, the coating agents of the second, fourth, sixth, and eighth aspects of the invention produce effects capable of facilitating removal of a product from the base material, and capable of elongating the life of the base material.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A surface treatment method of embodiments of the invention includes:

supplying titanium or the like to a base material coated a surface with a carbon film (or a nitrogen film), and performing a heating treatment under a prescribed temperature condition. As a result, it is possible to form a coating film capable of suppressing the occurrence of the initial peeling between the coating film and the base material, and capable of improving the fluidity. In addition, in description of embodiments of the invention, an area coated with a carbon film or the like is defined as a coating portion.

Below, a surface treatment method of a first embodiment will be described.

Figure 1:
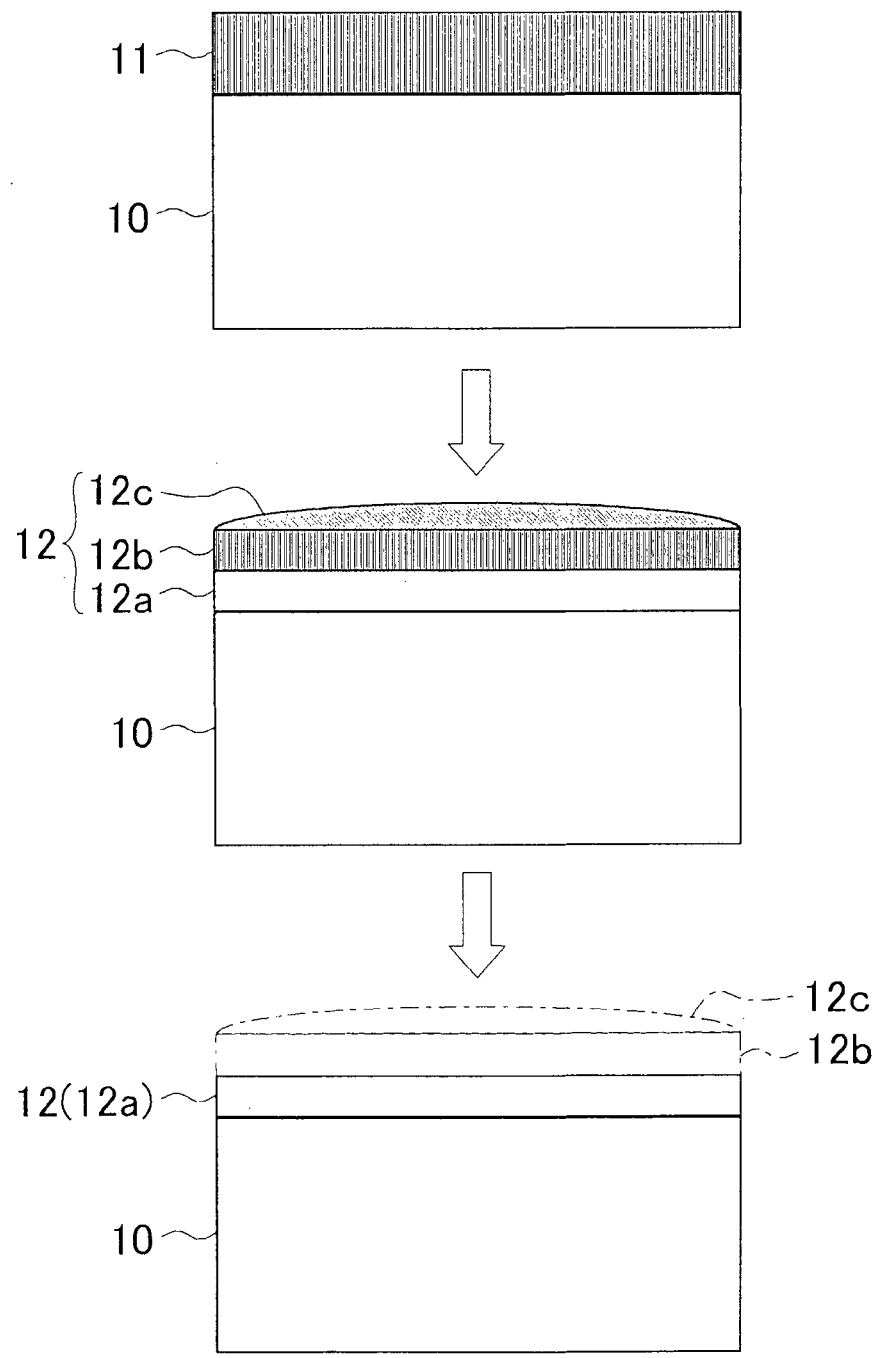
FIG. 1 is an explanatory view showing the procedure of a surface treatment method of a first embodiment of the invention.

As shown in FIG. 1, the first embodiment is a surface treatment method on a base material coated a surface with a carbon film.

First, a base material 10 will be described.

The base material 10 is a mold for casting formed in a substantially rectangular parallelepiped, and is formed of iron. The base material 10 is coated with a carbon film 11 on the surface (the top surface of the base material 10 in FIG. 1). The base material 10 is, for example, placed in a furnace under an inert gas (such as a nitrogen gas) atmosphere, and is heated to a prescribed temperature. At that step, an active gas (such as an acetylene gas) is supplied into the furnace, so that the surface of the base material 10 is coated with the carbon film 11.

In the first embodiment, the carbon film 11 is a carbon nanofiber.

Then, a description will be given to the procedure of the surface treatment method of the first embodiment.

First, with the surface treatment method of the first embodiment, TOG is applied to the carbon film 11 by a brush, thereby to supply titanium to the carbon film 11.

After supplying titanium, the base material 10 is placed in a furnace under an inert atmosphere (e.g., in a furnace under a nitrogen gas atmosphere), and the temperature in the furnace is adjusted to 500° C. Namely, the carbon film 11 is heated to 500° C. under an inert atmosphere.

As a result, on the base material 10, a coating film 12 is formed (see the base material 10 shown at the center of FIG. 1). In other words, in the first embodiment, the carbon film 11 after heating corresponds to the coating film 12.

Into the voids on the base material side of the carbon film 11 (the bottom side of the carbon film 11 in FIG. 1), much titanium penetrates during heating. Namely, the coating film 12 becomes densified, and is rendered in the strong state on the base material side 12a.

As a result, with the surface treatment method of the first embodiment, in first or second casting, the base material side 12a of the coating film 12 can be prevented from being peeled off from the base material 10. In other words, it is possible to suppress the occurrence of the initial peeling between the coating film and the base material.

On the other hand, into the voids on the surface side of the carbon film 11 (the top side of the carbon film 11 in FIG. 1), much titanium does not penetrate during heating. Namely, the coating film 12 is rendered in a weak state on the surface side. Below, such a portion of the coating film 12 rendered in a weak state is expressed as a "weak layer 12b".

Herein, TOG is applied onto the carbon film 11, which results in that a part of TOG is deposited in the form of a layer on the coating film 12. Below, such a layer deposited on the coating film 12 is expressed as an "excess coating film 12c".

When the coating film 12 heated to 500° C. is cooled under an air atmosphere, in the coating film 12, oxidation proceeds at temperatures around 240° C. or more. Thus, with the surface treatment method of the first embodiment, after the formation of the coating film 12, the temperature in the furnace is adjusted to 200° C., and the coating film 12 is cooled to 200° C. under an inert atmosphere.

As a result, with the surface treatment method of the first embodiment, it is possible to suppress proceeding of the oxidation of the coating film 12. For this reason, it is possible to improve the bonding force of the coating film 12. Further, it is possible to suppress the occurrence of hydrogen embrittlement between the base material 10 and the coating film 12 under the influence of hydrogen formed by oxidation. In other words, it is possible to improve the durability of the coating film 12.

After cooling the coating film 12, with the surface treatment method of the first embodiment, in the furnace under an inert atmosphere, the base material 10 is placed in a container storing an oil. Then, by a diaphragm for generating an ultrasonic wave, or the like, the coating film 12 is irradiated with an ultrasonic wave.

At this step, the weak layer 12*b* and the excess coating film 12*c* are each weak in bonding force, and hence, are peeled off from the base material 10 by cavitation caused by the ultrasonic wave (see the base material 10 shown on the bottom side of FIG. 1). On the other hand, the base material side 12*a* of the coating film 12 is strong (has been improved) in bonding force, and hence is not peeled off from the base material 10.

Namely, the coating film 12 is ultrasonically cleaned in an oil, thereby to remove the weak layer 12*b* and the excess coating film 12*c*.

As a result, with the surface treatment method of the first embodiment, it is possible to leave only the portion (the base material side 12*a*) of the coating film 12 having a strong bonding force. In other words, the coating film 12 can be made thin, and the whole coating film 12 can be rendered in a dense state. For these reasons, the coating film 12 can be stabilized. Further, it is possible to suppress the occurrence of the following situation: the weak layer 12*b* and the excess coating film 12*c* are caught in molten metal during casting, so that the weak layer 12*b* and the excess coating film 12*c* are mixed into a product as foreign matters.

Below, a description will be given to the results of a test of the fluidity of a test piece TP1 (see FIG. 2) including the coating film 12 formed therein using the surface treatment method of the first embodiment.

In the test, on a base material in the same shape as that of the base material 10 of the first embodiment, there was formed a carbon film reinforced by fullerene as in the related-art technology. As a result, a comparative test piece was manufactured.

Figure 2:
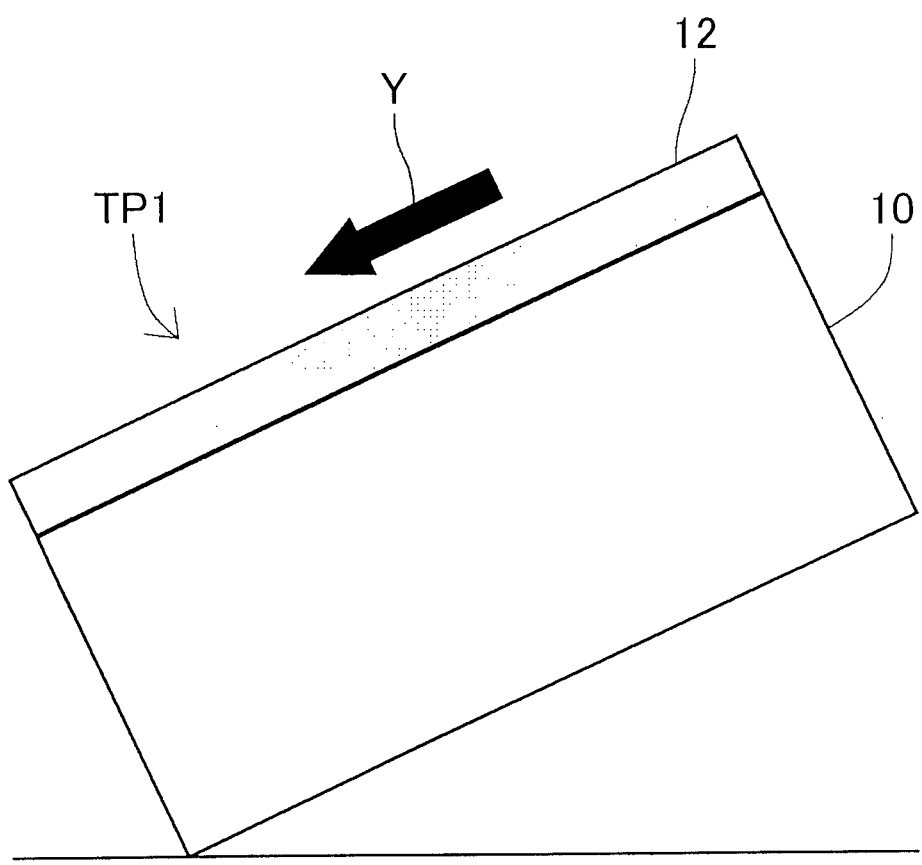
FIG. 2 is an explanatory view showing the contents of a test of fluidity.

As shown in FIG. 2, in the test, the test piece was inclined at 25° with respect to the horizontal plane. To the surfaces of the test piece TP1 of the first embodiment and the comparative test piece, molten aluminum Y at a prescribed temperature was poured.

On the surface of the comparative test piece, some of the molten aluminum Y was left as a remnant after the test. On the other hand, on the surface of the test piece TP1 of the first embodiment, such a remnant was not left after the test. Further, the molten aluminum Y which had flowed on the surface of the test piece TP1 of the first embodiment scattered farther to the downstream side of the flow direction (the left-hand side of FIG. 2) than for the comparative test piece.

Thus, the fluidity of the test piece TP1 of the first embodiment is better than the fluidity of the comparative test piece.

Also, in the test, the rate for the molten aluminum Y to flow down was measured as the melt flow rate. The melt flow rate serves as one index denoting the fluidity. The melt flow rate of the test piece TP1 of the first embodiment was a rate 10 times or more faster than the melt flow rate of the comparative test piece.

The test results up to this point indicate as follows: in the case where the coating film 12 is formed using the surface treatment method of the first embodiment, it is possible to largely improve the fluidity for molten aluminum.

This is due to the fact that, during heating, titanium and carbon combine to form titanium carbide having a large contact angle with respect to molten aluminum inside the coating film 12.

Namely, with the surface treatment method of the first embodiment, a heat treatment results in the presence of titanium carbide inside the coating film 12. This makes the coating film 12 less likely to be wetted with molten aluminum, resulting in an improvement of the fluidity for molten aluminum.

This results in that the base material 10 (mold) on which the coating film 12 is formed is good in fluidity. Accordingly, it is possible to suppress the occurrence of cavities and insufficient filling, and it is possible to transfer the shape of the cavity surface with precision. In other words, by using the surface treatment method of the first embodiment, it is possible to improve the casting quality.

As with the first embodiment, in the case of the base material 10 coated the surface with a carbon film of a carbon nanofiber, when TOG is applied onto the carbon film 11, the solution (titanium) can be held in the carbon film 11. For this reason, by using the surface treatment method of the first embodiment, it is possible to promote the combination between titanium and carbon during heating.

Thus, from the viewpoint of being capable of promoting the combination between titanium and carbon, the carbon film 11 may be a carbon film of amorphous carbon. Such amorphous carbon includes a carbon nanofiber, diamond-like carbon (DLC) or the like. Further, from the viewpoint of being capable of more promoting the combination between titanium and carbon, the carbon film 11 may be a carbon film of carbon nanofiber.

In the test of the fluidity, evaluation was also made on the fluidity of the test piece including a coating film formed therein by supplying zirconium or niobium to the carbon film 11, and in the same procedure as the surface treatment method of the first embodiment (see FIGS. 1 and 2).

In the test, octoxy tridecoxy zirconium and niobium pentoxide were applied to the carbon films 11 of different base materials 10, respectively. Thus, zirconium and niobium were supplied to the carbon films 11, respectively.

The melt flow rates of the test pieces including zirconium and niobium supplied therein, respectively, were each a rate 10 times or more faster than the melt flow rate of the comparative test piece.

This is due to the following fact: during heating, zirconium or niobium and carbon combined to form zirconium carbide or niobium carbide having a large contact angle with respect to molten aluminum inside the coating film.

The test results up to this point indicate that those exhibiting a large contact angle with respect to molten aluminum when combined with carbon may be desirably supplied to the carbon film 11.

Table 1 shown below shows each contact angle with respect to molten aluminum in vacuum.

TABLE 1

| | Contact angle (°) when combined with carbon |
|---|---|
| Titanium | 148 |
| Zirconium | 150 |
| Niobium | 136 |
| Vanadium | 130 |
| Hafnium | 148 |
| Tantalum | 145 |
| Tungsten | 135 |

As also apparent from the Table 1, the carbon film 11 may desirably be supplied with titanium, zirconium, niobium, vanadium, hafnium, tantalum, tungsten, or the like.

More particularly, the carbon film 11 may desirably be supplied with at least any one of titanium, zirconium, niobium, vanadium, hafnium, tantalum, tungsten, and the like. Therefore, with the surface treatment method of the first embodiment, it is acceptable that the carbon film 11 is supplied with any one of titanium, zirconium, and niobium.

Also in this case, by performing heating, cooling, and cleaning in the foregoing procedure, it is possible to obtain the same effects as those of the first embodiment (see FIG. 1).

In the test of the fluidity, different solutions (TOG and tetrakis(2-ethylhexyloxy)titanium, niobium oxide and niobium pentoxide (nano particles)) were applied to the carbon films 11 of different base materials 10, respectively, to evaluate the fluidities. Also in this case, all the test pieces were largely improved in fluidity.

From the description up to this point, it is indicated that the solutions to be applied onto the carbon film 11 may be desirably solutions containing titanium, zirconium, niobium, vanadium, hafnium, tantalum, tungsten, or the like. Table 2 below shows the solutions to be applied onto the carbon film 11. Incidentally, Table 2 shows solutions containing titanium, zirconium, or niobium for convenience.

TABLE 2

| Coating solutions | |
|---|---|
| Titanium series | Tetra-i-propoxytitanium |
| | Tetra-n-butoxytitanium |
| | Tetrakis(2-ethylhexyloxy)titanium |
| | TOG |
| | Di-i-popoxy•bis(acetylacetonato)titanium |
| Zirconium series | Tetra-n-butoxyzirconium |
| | Octoxy•tridecoxyzirconium |
| | Monobutoxyzirconium (IV) tri-i-stearate |
| Niobium series | Niobium pentoxide |
| | Niobium pentoxide (nano particles) |

Incidentally, with the surface treatment method of the first embodiment, the solutions are not necessarily required to be applied to supply titanium, zirconium, niobium, vanadium, hafnium, tantalum, tungsten, or the like. Namely, it is acceptable that the carbon film is supplied with a powder of titanium or the like.

Further, with the surface treatment method of the first embodiment, the carbon film is not necessarily required to be heated to 400° C. Namely, the carbon film may be desirably heated to a temperature enough to allow titanium, zirconium, niobium, vanadium, hafnium, tantalum, tungsten, or the like to combine with carbon. Specifically, the carbon film may be desirably heated to 400° C. or more under an inert atmosphere.

Then, a description will be given to a surface treatment method of a second embodiment.

Figure 3:
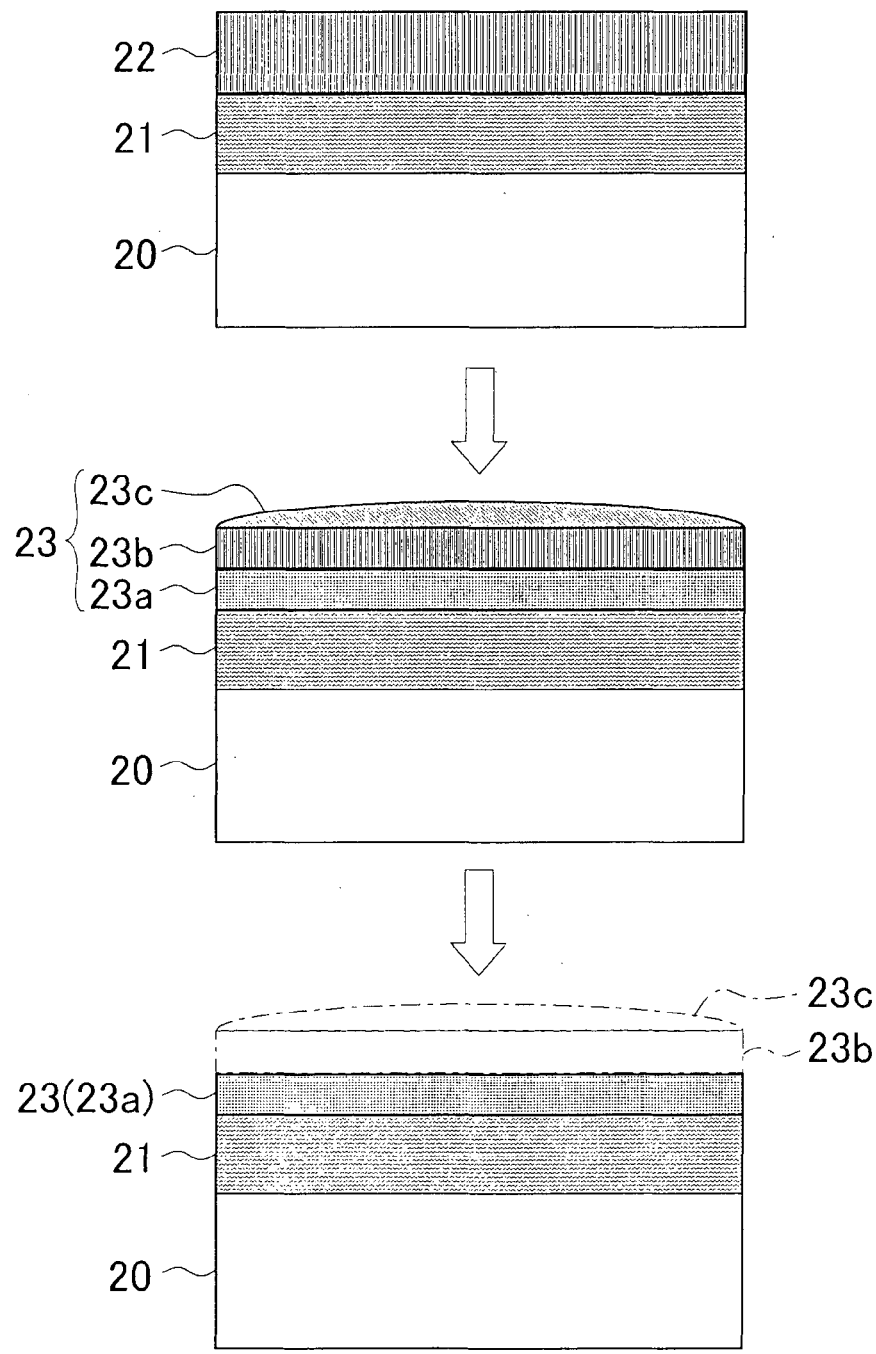
FIG. 3 is an explanatory view showing the procedure of a surface treatment method of a second embodiment of the invention.

As shown in FIG. 3, the second embodiment is a surface treatment method on a base material which is surface coated with a nitrogen film, and on which the nitrogen film is coated with a carbon film.

A base material 20 is a mold for casting formed in a substantially rectangular parallelepiped, and is formed of iron. The base material 20 is coated on the surface thereof (the top surface of the base material 20 in FIG. 3) with a nitrogen film 21, and the nitrogen film 21 is coated with a carbon film 22. In other words, the nitrogen film 21 is situated between the base material 20 and the carbon film 22. The nitrogen film 21 and the carbon film 22 form a coating portion.

In the second embodiment, the carbon film 22 is a carbon nanofiber.

Then, a description will be given to the procedure of a surface treatment method of the second embodiment.

First, with the surface treatment method of the second embodiment, TOG is applied to the carbon film 22 by a brush, thereby to supply titanium to the carbon film 22. The carbon film 22 is heated to 500° C. under an inert atmosphere.

As a result, on the base material 20, a coating film 23 is formed (see the base material 20 shown at the center of FIG. 3). In the second embodiment, the carbon film 22 situated on the topmost surface side of the coating portion corresponds to the coating film 23.

Into the voids on the base material side of the carbon film 22 (the bottom side of the carbon film 22 in FIG. 3), much titanium penetrates during heating. Namely, the coating film 23 becomes densified, and is rendered in the strong state on the base material side 23a.

As a result, with the surface treatment method of the second embodiment, it is possible to suppress the occurrence of the initial peeling between the coating film and the base material.

On the other hand, into the voids on the surface side of the carbon film 22 (the top side of the carbon film 22 in FIG. 3), much titanium does not penetrate during heating. Namely, the surface side of the coating film 23 is formed as a weak layer 23b.

Further, TOG is applied onto the carbon film 22. As a result, an excess coating film 23c is formed in the coating film 23.

After the formation of the coating film 23, with the surface treatment method of the second embodiment, in the same procedure as that of the surface treatment method of the first embodiment, the coating film 23 is cooled to 200° C. under an inert atmosphere.

As a result, with the surface treatment method of the second embodiment, it is possible to suppress proceeding of the oxidation of the coating film 23. Accordingly, it is possible to improve the bonding force and the durability of the coating film 23.

After cooling the coating film 23, with the surface treatment method of the second embodiment, in the same procedure as that of the surface treatment method of the first embodiment, the coating film 23 is ultrasonically cleaned in an oil, thereby to remove the weak layer 23b and the excess coating film 23c (see the base material 20 shown on the bottom side of FIG. 3).

As a result, with the surface treatment method of the second embodiment, it is possible to leave only the portion (the base material side 23a) of the coating film 23 having a strong bonding force. For this reason, the coating film 23 can be stabilized. Further, it is possible to suppress the occurrence of a situation in which, during casting, the weak layer 23b and the excess coating film 23c are mixed as foreign matters into a product.

As described above, much titanium penetrates into the base material side of the carbon film 22. For this reason, during heating, titanium and carbon combine, and titanium and nitrogen combine. In other words, with the surface treatment method of the second embodiment, titanium carbide and titanium nitride are formed inside the coating film 23 by a heating treatment. Titanium nitride is larger in contact angle with respect to molten aluminum than titanium carbide.

Namely, with the surface treatment method of the second embodiment, a heat treatment results in the presence of titanium carbide and titanium nitride inside the coating film 23. This makes the coating film 23 less likely to be wetted with molten aluminum than the coating film 12 of the first embodiment.

Therefore, when the coating film 23 is formed using the surface treatment method of the second embodiment, the fluidity for molten aluminum can be more improved than when the coating film 12 is formed using the surface treatment method of the first embodiment. In other words, the surface treatment method of the second embodiment can more improve the casting quality.

As with the second embodiment, in the case of the base material 20 coated the surface with a carbon film of a carbon nanofiber, when TOG is applied onto the carbon film 22, the solution (titanium) can be held in the carbon film 22. For this reason, it is possible to promote the combination between titanium and carbon during heating.

Namely, from the viewpoint of being capable of promoting the combination between titanium and carbon, the carbon film 22 may be amorphous carbon. Such amorphous carbons include a carbon nanofiber, DLC or the like. Further, from the viewpoint of being capable of more promoting the combination between titanium and carbon, the carbon film 22 may be a carbon nanofiber.

Herein, those exhibiting a large contact angle with respect to molten aluminum when combined with nitrogen and carbon, respectively, may be desirably supplied to the carbon film 22.

Table 3 shown below shows each contact angle with respect to molten aluminum in vacuum.

TABLE 3

|  | Contact angle (°) when combined with carbon | Contact angle (°) when combined with nitrogen |
|---|---|---|
| Titanium | 148 | 166 |
| Zirconium | 150 | 167 |
| Niobium | 136 | 156 |

As also apparent from the Table 3, the carbon film 22 may be desirably supplied with titanium, zirconium, niobium, or the like.

More particularly, the carbon film 22 may be desirably supplied with at least any one of titanium, zirconium, niobium, and the like. Therefore, with the surface treatment method of the second embodiment, it is acceptable that the carbon film 22 is supplied with at least any one of titanium, zirconium, and niobium.

Also in this case, by performing heating, cooling, and cleaning in the foregoing procedure, it is possible to obtain the same effects as those of the second embodiment (see FIG. 3).

Whereas, the solutions to be coated onto the carbon film 22 may be desirably solutions containing titanium, zirconium, niobium, or the like. Such solutions include the solutions as shown in the Table 2, or the like.

Incidentally, with the surface treatment method of the second embodiment, the solutions are not necessarily required to be applied to supply titanium, zirconium, niobium, or the like. Namely, it is acceptable that the carbon film is supplied with a powder of titanium or the like.

Further, with the surface treatment method of the second embodiment, the carbon film is not necessarily required to be heated to 400° C. Namely, the carbon film may be desirably heated to a temperature enough to allow titanium, zirconium, niobium, or the like to combine with nitrogen and carbon. Specifically, the carbon film may be desirably heated to 400° C. or more under an inert atmosphere.

Then, a description will be given to a surface treatment method of a third embodiment.

Figure 4:
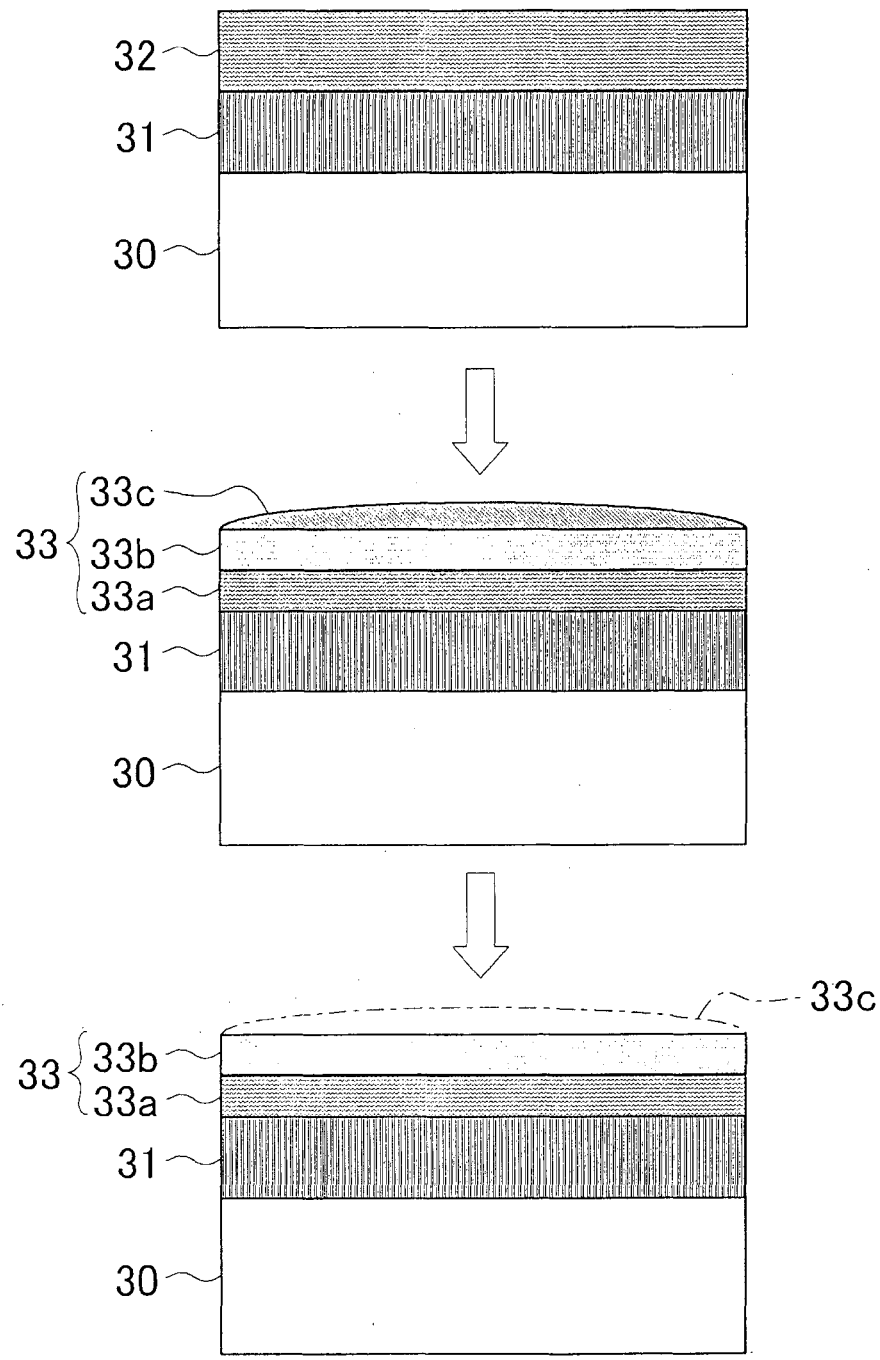
FIG. 4 is an explanatory view showing the procedure of a surface treatment method of a third embodiment of the invention.

As shown in FIG. 4, the third embodiment is a surface treatment method on a base material which is coated with a nitrogen film on the topmost surface side of a coating portion.

A base material 30 of the third embodiment is a mold for casting formed in a substantially rectangular parallelepiped, and is formed of iron. The base material 30 is coated on the surface thereof (the surface of the base material 30 in FIG. 4) with a carbon film 31, and the carbon film 31 is coated with a nitrogen film 32. In other words, the nitrogen film 32 is situated at the topmost surface side among the base material 30, the carbon film 31, and the nitrogen film 32. Namely, the base material 30 is coated with the nitrogen film 32 on the topmost surface side of the coating portion (the topmost side in FIG. 4).

Incidentally, the base material may be desirably coated on the topmost surface side of the coating portion with a nitrogen film. Namely, the base material may be desirably, for example, a base material merely surface coated with a nitrogen film. Alternatively, the base material may also be desirably a base material which is surface coated with a carbon film, with the carbon film being coated with a nitrogen film as shown in FIG. 3.

Then, a description will be given to the procedure of a surface treatment method of the third embodiment.

First, with the surface treatment method of the third embodiment, TOG is applied to the nitrogen film 32 by a brush, thereby to supply titanium to the nitrogen film. 32. The nitrogen film 32 is heated to 500° C. under an inert atmosphere.

As a result, on the base material 30, a coating film 33 is formed (see the base material 30 shown at the center of FIG. 4). In the third embodiment, the nitrogen film 32 situated at the topmost surface side of the coating portion corresponds to the coating film 33.

Into the voids on the surface side of the nitrogen film 32 (the top side of the nitrogen film 32 in FIG. 4), much titanium penetrates during heating. Namely, the coating film 33 becomes densified, and is rendered in the strong state on the surface side 33b.

Further, TOG is applied onto the nitrogen film 32. As a result, an excess coating film 33c is formed in the coating film 33.

With the surface treatment method of the third embodiment, after the formation of the coating film 33, in the same procedure as that of the surface treatment method of the first embodiment, the coating film 33 is cooled to 200° C. under an inert atmosphere.

As a result, with the surface treatment method of the third embodiment, it is possible to suppress proceeding of the oxidation of the coating film 33. Accordingly, it is possible to improve the bonding force and the durability of the coating film 33.

After cooling the coating film 33, with the surface treatment method of the third embodiment, in the same procedure as that of the surface treatment method of the first embodiment, the coating film 33 is ultrasonically cleaned in an oil, thereby to remove the excess coating film 33c (see the base material 30 shown on the bottom side of FIG. 4).

As a result, with the surface treatment method of the third embodiment, it is possible to leave only the portions (the base material side 33a and the surface side 33b) of the coating film 33 having a strong bonding force. For this reason, the coating film 33 can be stabilized. Further, it is possible to suppress the occurrence of a situation in which, during casting, the excess coating film 33c is mixed as a foreign matter into a product.

With the surface treatment method of the third embodiment, by a heat treatment, titanium and nitrogen combine to form titanium nitride inside the coating film 33. As described above, titanium nitride is larger in contact angle with respect to molten aluminum than titanium carbide.

Namely, with the surface treatment method of the third embodiment, a heat treatment results in the presence of titanium nitride inside the coating film 33. This makes the coating film 33 less likely to be wetted with molten aluminum than the coating film 12 of the first embodiment.

Therefore, when the coating film 33 is formed using the surface treatment method of the third embodiment, the fluidity for molten aluminum can be more improved than when the coating film 12 is formed using the surface treatment method of the first embodiment. In other words, the surface treatment method of the third embodiment can more improve the casting quality.

Further, with the surface treatment method of the third embodiment, the base material 30 coated on the topmost surface side of the coating portion with the nitrogen film 32 (the topmost surface side not being coated with a carbon film) is used. For this reason, it is possible to suppress the occurrence of the initial peeling.

Herein, with the surface treatment method of the third embodiment, those exhibiting a large contact angle with respect to molten aluminum when combined with nitrogen may be desirably supplied to the nitrogen film 32. Namely, the nitrogen film 32 may be desirably supplied with titanium, zirconium, niobium, or the like (see the contact angles when combined with nitrogen of the Table 3).

More particularly, the nitrogen film 32 may be desirably supplied with at least any one of titanium, zirconium, niobium, and the like. Therefore, with the surface treatment method of the third embodiment, it is acceptable that the nitrogen film 32 is supplied with at least any one of titanium, zirconium, and niobium.

Also in this case, by performing heating, cooling, and cleaning in the foregoing procedure, it is possible to obtain the same effects as those of the third embodiment (see FIG. 4).

Whereas, the solutions to be coated onto the nitrogen film 32 may be desirably solutions containing titanium, zirconium, niobium, or the like. Such solutions include the solutions as shown in the Table 2, and the like.

Incidentally, with the surface treatment method of the third embodiment, the solutions are not necessarily required to be applied to supply titanium, zirconium, niobium, or the like. Namely, it is acceptable that the nitrogen film is supplied with a powder of titanium or the like.

Further, with the surface treatment method of the third embodiment, the nitrogen film is not necessarily required to be heated to 400° C. Namely, the nitrogen film may be desirably heated to a temperature enough to allow titanium, zirconium, niobium, and the like to combine with nitrogen. Specifically, the nitrogen film may be desirably heated to 400° C. or more under an inert atmosphere.

Then, a description will be given to a surface treatment method of a fourth embodiment.

Figure 5:
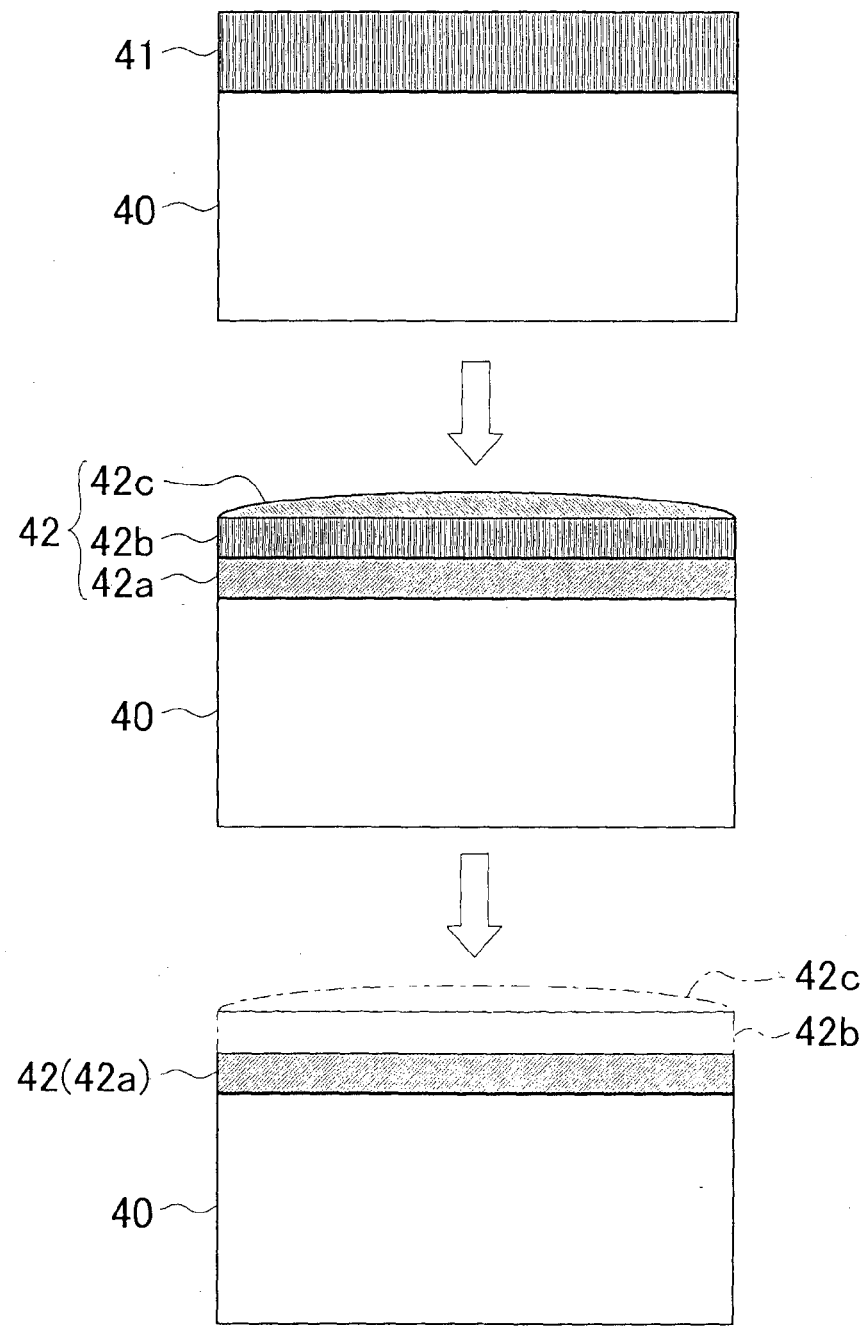
FIG. 5 is an explanatory view showing the procedure of a surface treatment method of a fourth embodiment of the invention.

As shown in FIG. 5, the fourth embodiment is a surface treatment method on a base material which is coated with a carbon film of amorphous carbon on the topmost surface side of a coating portion.

For a base material 40 of the fourth embodiment, there is used a base material of the same configuration as that of the first embodiment (see FIG. 1). Namely, the base material 40 is coated on the topmost surface side of the coating portion (the topmost side of FIG. 5) with the carbon film 41.

Incidentally, the base material may be desirably coated on the topmost surface side of the coating portion with a carbon film. Namely, the base material may be desirably, for example, a base material only surface coated with a carbon film as shown in FIG. 5. Alternatively, the base material may also be desirably a base material which is surface coated with a nitrogen film, and on which the nitrogen film is coated with a carbon film as shown in FIG. 3.

Whereas, the carbon film may desirably be amorphous carbon. Such amorphous carbons include a carbon nanofiber, DLC or the like.

Then, a description will be given to the procedure of a surface treatment method of the fourth embodiment.

First, with the surface treatment method of the fourth embodiment, TOG is applied (supplied) to a carbon film 41 coating the surface of the base material 40 by a brush. Then, in the same procedure as that of the surface treatment method of the first embodiment, the carbon film 41 is heated to 350° C. under an inert atmosphere.

In other words, with the surface treatment method of the fourth embodiment, a heat treatment is performed under different temperature conditions from those in the surface treatment methods of the first embodiment to the third embodiment.

As a result, on the base material 40, a coating film 42 is formed (see the base material 40 shown at the center of FIG. 5). In the fourth embodiment, the carbon film 41 after heating corresponds to the coating film 42.

Into the voids on the base material side of the carbon film 41 (the bottom side of the carbon film 41 in FIG. 5), much titanium penetrates during heating. Namely, the coating film 42 becomes densified, and is rendered in the strong state on the base material side 42a.

As a result, with the surface treatment method of the fourth embodiment, it is possible to suppress the occurrence of the initial peeling between the coating film and the base material.

On the other hand, into the voids on the surface side of the carbon film 41 (the top side of the carbon film 41 in FIG. 5), much titanium does not penetrate during heating. Namely, the surface side of the coating film 42 is formed as a weak layer 42b.

Further, as a result of applying TOG onto the carbon film 41, on the coating film 42, an excess coating film 42c is formed.

With the surface treatment method of the fourth embodiment, after forming the coating film 42, in the same procedure as that of the surface treatment method of the first embodiment, the coating film 42 is cooled to 200° C. under an inert atmosphere.

As a result, with the surface treatment method of the fourth embodiment, it is possible to suppress proceeding of the oxidation of the coating film 42. Accordingly, it is possible to improve the bonding force and the durability of the coating film 42.

After cooling the coating film 42, with the surface treatment method of the fourth embodiment, in the same procedure as that of the surface treatment method of the first embodiment, the coating film 42 is ultrasonically cleaned in an oil, thereby to remove the weak layer 42b and the excess coating film 42c (see the base material 40 shown on the bottom side of FIG. 5).

As a result, with the surface treatment method of the fourth embodiment, it is possible to leave only the portion (the base material side 42a) of the coating film 42 having a strong bonding force. For this reason, the coating film 42 can be stabilized. Further, it is possible to suppress the occurrence of a situation in which, during casting, the weak layer 42b and the excess coating film 42c are mixed as foreign matters into a product.

Herein, the test of the fluidity was performed in the same procedure as that of the first embodiment. As a result, the melt flow rate of the test piece including the coating film 42 formed using the surface treatment method of the fourth embodiment was about five times faster rate than the melt flow rate of the comparative test piece (see FIG. 2).

In other words, when the coating film 42 is formed using the surface treatment method of the fourth embodiment, the fluidity for molten aluminum can be largely improved. As a result, the surface treatment method of the fourth embodiment can more improve the casting quality.

Table 4 shown below shows the X-ray diffraction results of the coating film 42 formed using the surface treatment method of the fourth embodiment (the results on the right-hand side of Table 4), and the X-ray diffraction results of the comparative carbon film (the results on the left-hand side of Table 4). Incidentally, the comparative carbon film is a carbon film obtained by only cleaning a carbon film of a carbon nanofiber with ultrasonic wave.

TABLE 4

|  |  | Comparison | Fourth Embodiment |
|---|---|---|---|
| Conditions | $C_n$ | Included | Included |
|  | TOG application | — | Performed |
|  | Heating in nitrogen atmosphere | — | 350° C. |
|  | Ultrasonic cleaning in oil | Performed | Performed |
| Precipitates | Amorphous component | CC | AA |
|  | $Fe_3C$ | BB | — |
|  | FeS | BB | BB |
|  | S | BB | — |
|  | FeTi | — | BB |
|  | $V_3O_5$ | — | BB |

Incidentally, -, CC, BB, and AA in the Table 4 each represent the degree of the diffraction strength. The sign "-" represents as follows: the diffraction strength was very weak, so that the target component was judged as being not present in the coating film 42 (carbon film). The sign "CC" represents as follows: the diffraction strength was weak, so that the target component was judged as being present in a slight amount in the coating film 42 (carbon film). The sign "BB" represents as follows: the diffraction strength was intermediate, so that the target component was judged as being present in it certain amount in the coating film 42 (carbon film). The sign "AA" represents as follows: the diffraction strength was strong, so that the target component was judged as being present in a large amount in the coating film 42 (carbon film).

As also apparent from the Table 4, in the coating film 42 of the fourth embodiment, the crystalline components (cementite ($Fe_3C$) and sulfur (S)) detected in the comparative carbon film ceased to be detected. In other words, in the coating film 42 of the fourth embodiment, the crystalline components were reduced in amount by the heat treatment.

Further, the coating film 42 of the fourth embodiment was larger in diffraction strength of the amorphous components than the comparative carbon film. In other words, the coating film 42 of the fourth embodiment was increased in contents of the amorphous components by the heat treatment.

Namely, with the surface treatment method of the fourth embodiment, the heat treatment suppresses crystallization of the coating film 42, and promotes amorphization of the coating film 42. As a result, the fluidity for molten aluminum is improved.

Figure 6:
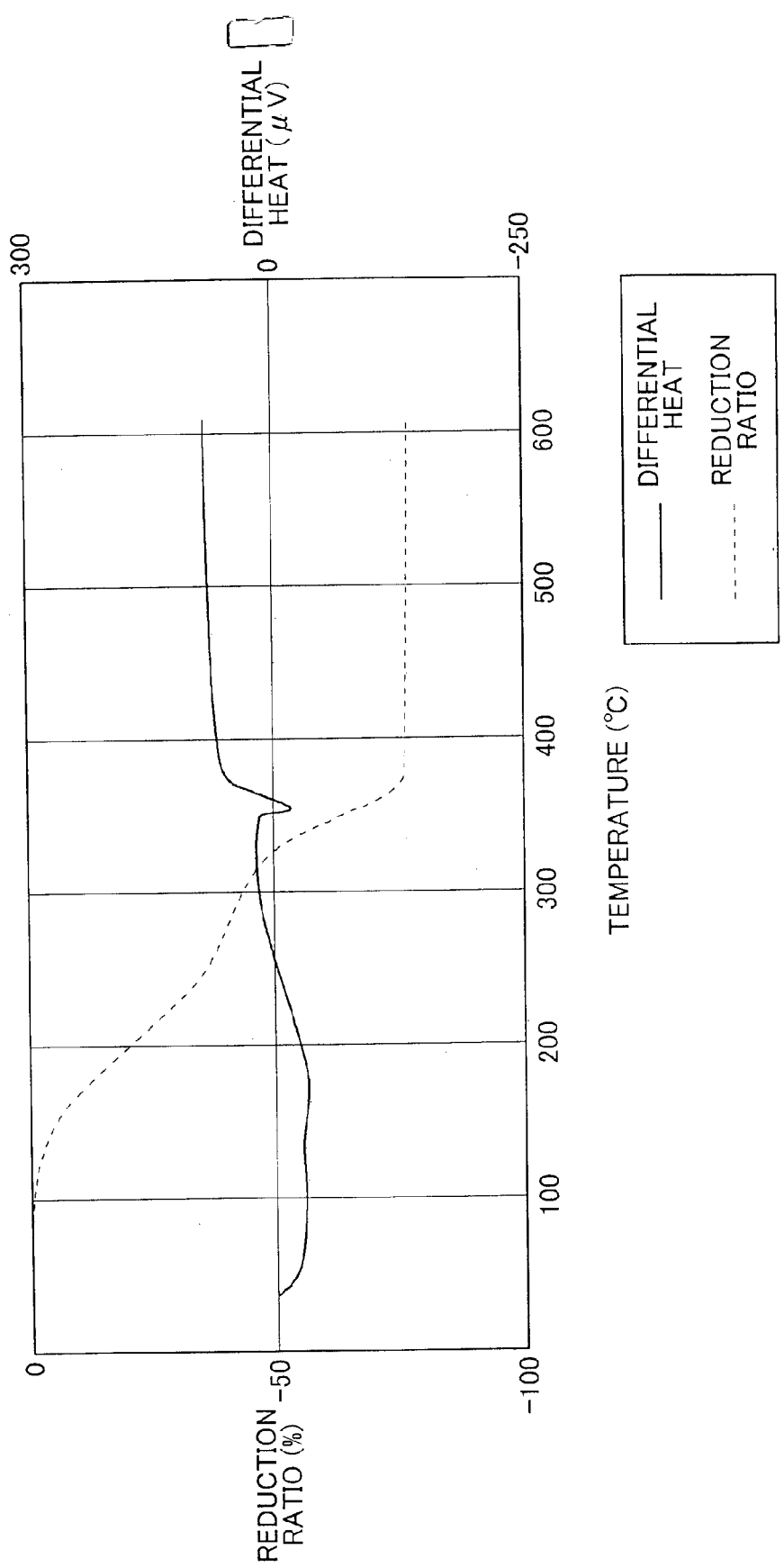
FIG. 6 is a view showing the results obtained by performing a differential thermal analysis on a mixture of a carbon film before heating and titanium-i-propoxyoctylene glycolate (which will be hereinafter expressed as "TOG") under an inert atmosphere.

FIG. 6 shows the results obtained by performing a differential thermal analysis on a mixture of the carbon film 41 before heating, cut from the base material 10 and TOG under an inert atmosphere (nitrogen gas atmosphere).

As shown in FIG. 6, within the temperature region between 100° C. or more and 330° C. or less, the weight was reduced without reaction. From this, it is considered that glycol in TOG has been evaporated.

Within the temperature region between 330° C. or more and 360° C. or less, heat absorption and weight reduction were caused. Namely, within the temperature region between 330° C. or more and 360° C. or less, TOG underwent a reduction reaction.

At a higher temperature than 360° C., the reduction reaction was completed, and the weight reduction was caused.

In other words, with the surface treatment method of the fourth embodiment, the carbon film 41 is heated to 350° C. under an inert atmosphere, so that TOG is reduced.

Figure 10:
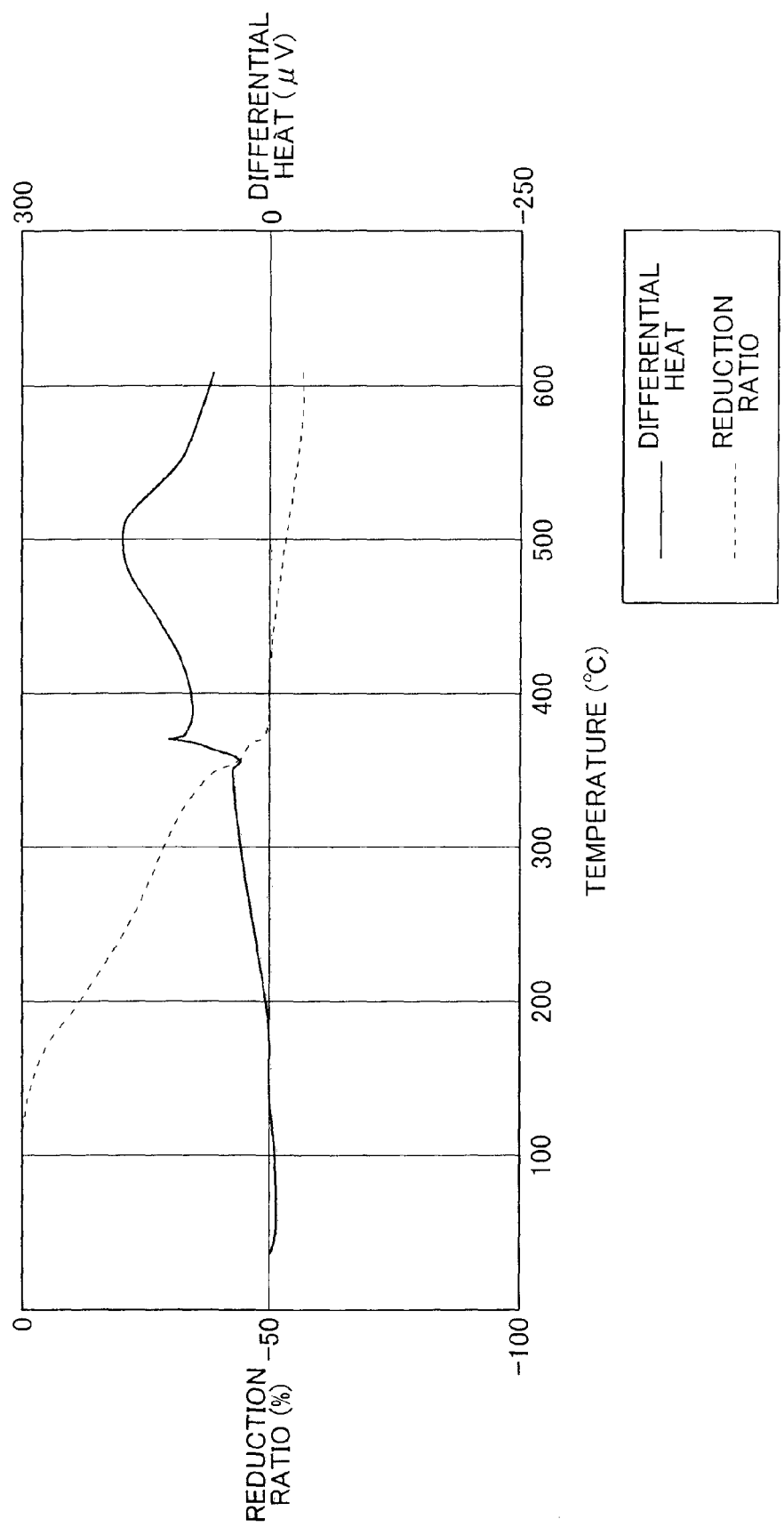
FIG. 10 is a view showing the results obtained by performing a differential thermal analysis on a mixture of a carbon film before heating and TOG under an air atmosphere.

FIG. 10 shows the results obtained by performing a differential thermal analysis on a mixture of the carbon film 41 before heating, cut from the base material 10, and TOG under an air atmosphere.

As shown in FIG. 10, within the temperature region between 360° C. or more and 380° C. or less, heat generation and weight reduction were caused. Namely, within the temperature region between 360° C. or more and 380° C. or less, TOG underwent an oxidation reaction.

Such results of the differential thermal analyses shown in FIGS. 6 and 10 indicate as follows: in the heat treatments under an inert atmosphere and under an air atmosphere, a difference is caused in temperature between the reduction reaction and the oxidation reaction.

From this, it is considered as follows: in the treatment of heating to 350° C. under an inert atmosphere, TOG underwent freezing point depression, so that the coating film 42 was rendered in a liquid phase sintering state; this promoted amorphization of the coating film 42, and cementite and sulfur were coated with the amorphous component; as a result, the coating film 42 was suppressed from being crystallized; thus, cementite and sulfur ceased to be detected by X-ray diffraction.

Namely, with the surface treatment method of the fourth embodiment, the carbon film 41 is heated to a temperature for allowing TOG to undergo a reduction reaction under an inert atmosphere. The coating film 42 is suppressed from being crystallized, and promoted amorphization of the coating film 42. As a result. With the surface treatment method of the fourth embodiment. The coating film 42 containing amorphous components in large amounts is formed, and the fluidity for molten aluminum is improved.

Below, a description will be given to the results obtained by testing the wear resistance of a test piece TP4 including the coating film 42 formed therein using the surface treatment method of the fourth embodiment (see FIG. 7).

In the test, the base material obtained by only cleaning a carbon film of a carbon nanofiber with ultrasonic wave was manufactured as a comparative test piece.

Figure 7:
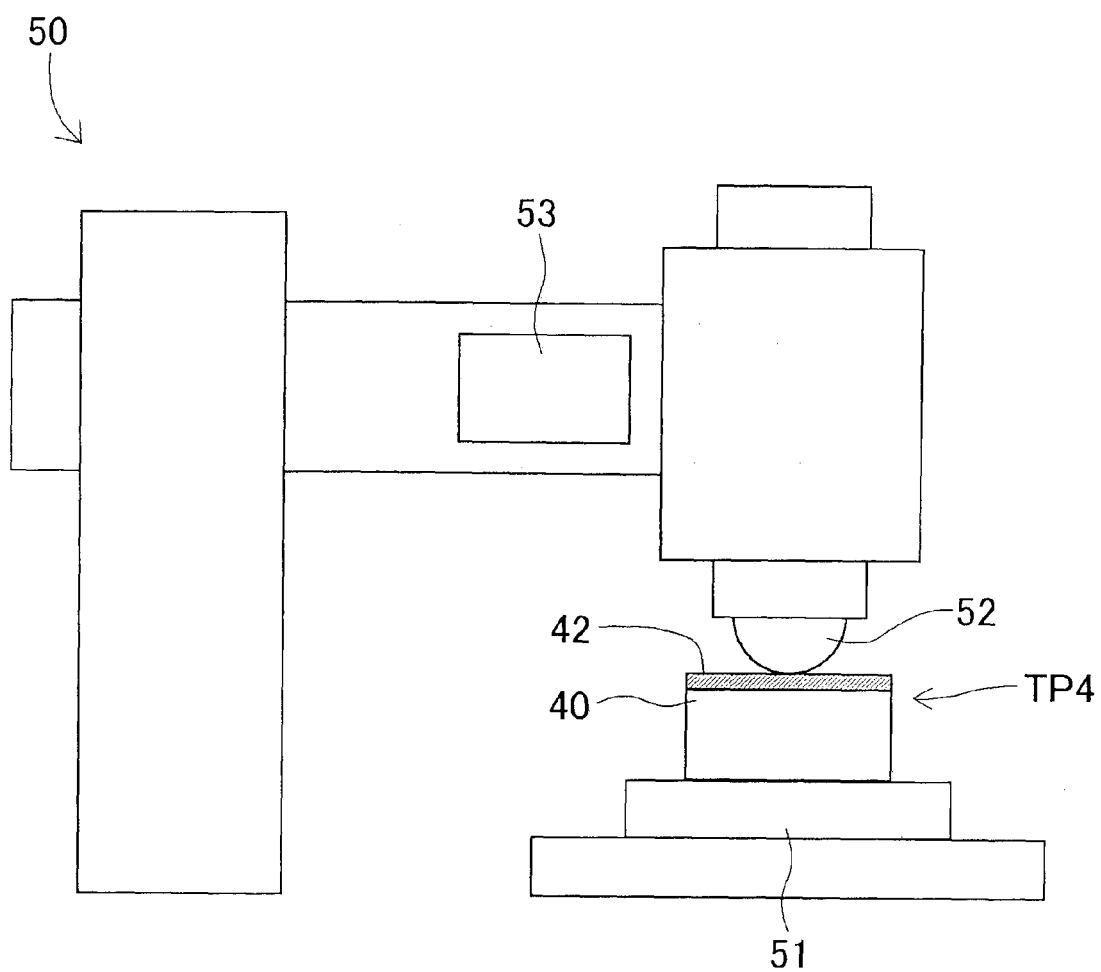
FIG. 7 is a schematic diagram of a friction and wear tester.

As shown in FIG. 7, in the test, using a friction and wear tester 50, the wear resistances of the test piece TP4 of the fourth embodiment, and the comparative test piece were evaluated.

The friction and wear tester 50 includes a table 51, a ball material 52, a strain gage 53, and the like.

On the table 51, the test piece TP4 of the fourth embodiment or the comparative test piece is mounted. The ball material 52 is in contact with the coating film 42 or the carbon film of the comparative test piece at the bottom end. The strain gage 53 measures the strain degree of the ball material 52 when the ball material 52 is pulled, or in other situations.

In the test, the ball material 52 was pressed against the test piece TP4 of the fourth embodiment or the comparative test piece under a prescribed load. Then, the test piece TP4 of the fourth embodiment or the comparative test piece was relatively moved with respect to the ball material 52. In the test, based on the measurement results of the strain gage 53 at this step, the coefficient of friction was calculated. The relation between the sliding distance and the coefficient of friction was evaluated.

Figure 8:
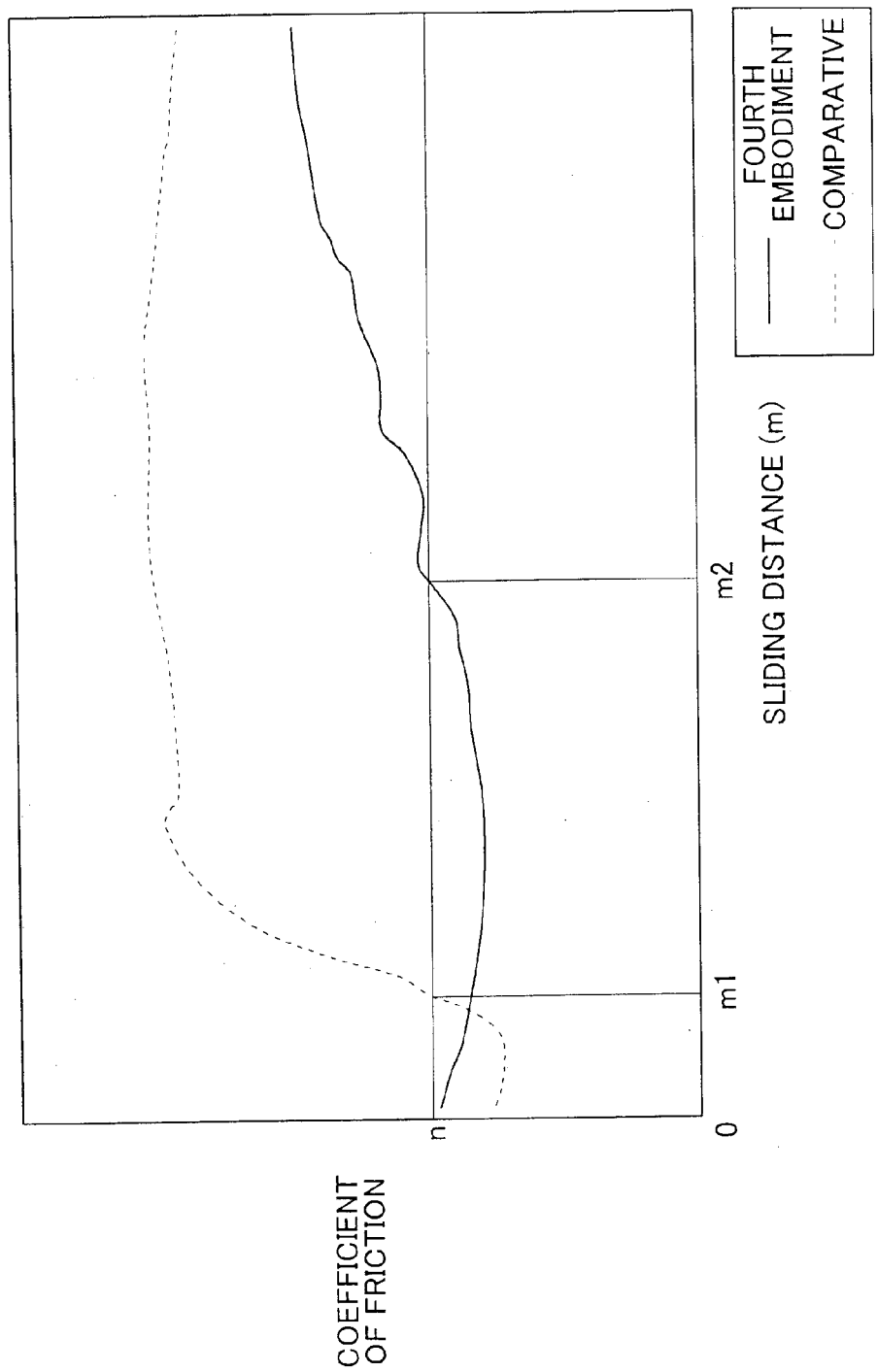
FIG. 8 is a view showing the results of the measurement of the sliding distances of a test piece of the fourth embodiment of the invention, and a comparative test piece.

FIG. 8 shows the relation between the sliding distance and the coefficient of friction acquired using the friction and wear tester 50.

As shown in FIG. 8, at the initial point in time, the coefficient of friction of the test piece TP4 of the fourth embodiment was higher than the coefficient of friction of the comparative test piece. This is considered to be due to the lubricating action of fullerene present without amorphization in the carbon film of the comparative test piece.

For the test piece TP4 of the fourth embodiment, up to a given sliding distance, the coefficient of friction gradually decreased with an increase in sliding distance. Then, for the test piece TP4 of the fourth embodiment, the coefficient of friction gradually increased with an increase in sliding distance.

On the other hand, for, the comparative test piece, the coefficient of friction sharply increased with an increase in sliding distance. Then, for the comparative test piece, the coefficient of friction ceased to largely vary.

When the test piece TP4 of the fourth embodiment is slid by a slightly shorter distance than a sliding distance m1, the coefficient of friction was smaller than the coefficient of friction of the comparative test piece, and then was not larger than the coefficient of friction of the comparative test piece.

Figure 9:
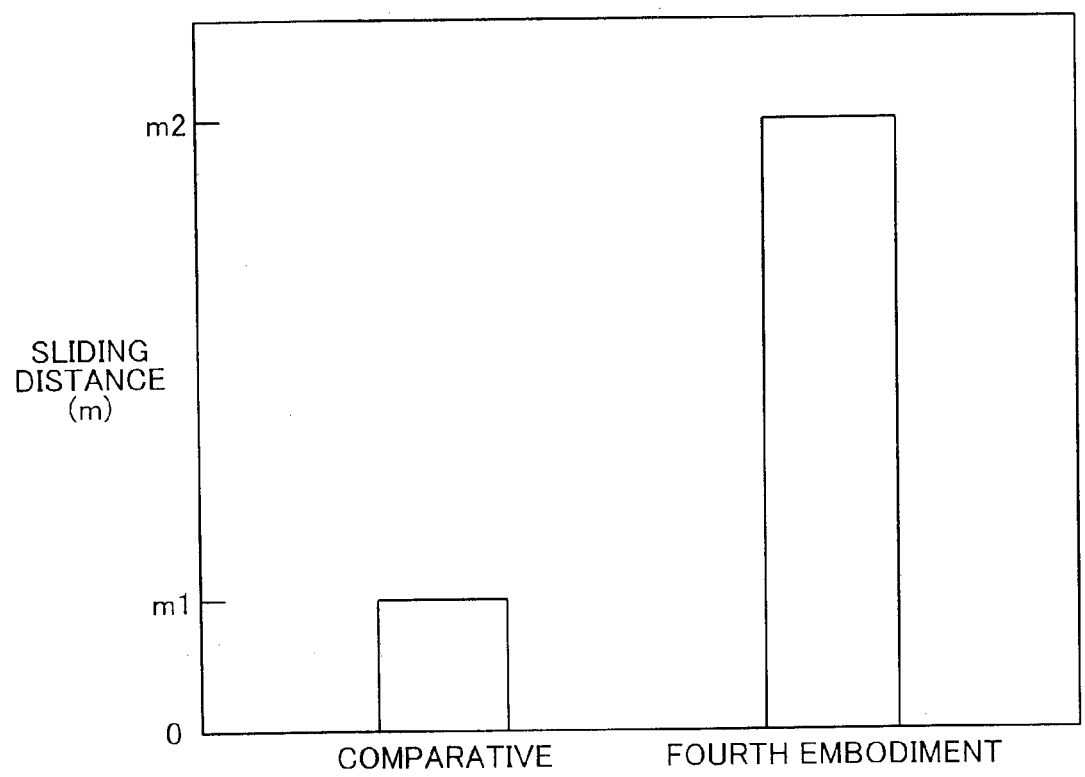
FIG. 9 is a view showing the wear resistances of the test piece of the fourth embodiment of the invention, and the comparative test piece.

FIG. 9 shows the relation between the sliding distance m1 for the comparative test piece and the sliding distance m2 for the test piece TP4 of the fourth embodiment when each coefficient of friction increased to a prescribed coefficient of friction n in the relation between the sliding distance and the coefficient of friction shown in FIG. 8.

As shown in FIG. 9, the test piece TP4 of the fourth embodiment was about five times larger in sliding distance than the comparative test piece.

The test results up to this point indicate as follows: when the coating film 42 is formed using the surface treatment method of the fourth embodiment, the wear resistance can be largely improved.

With the surface treatment method of the fourth embodiment, TOG is not necessarily required to be applied onto the carbon film 41. Any solution is acceptable so long as it is a solution containing titanium reducible by a heat treatment under an inert atmosphere. Table 5 shown below shows such solutions containing titanium.

TABLE 5

| Coating solution | |
|---|---|
| Titanium series | Tetra-i-propoxytitanium |
| | Tetra-n-butoxytitanium |
| | Tetrakis(2-ethylhexyloxy)titanium |
| | TOG |
| | Di-i-popoxy•bis(acetylacetonato)titanium |

If other solutions than TOG shown in the Table 5 are applied, a differential thermal analysis is performed on a mixture of the carbon film 41 before heating, cut from the base material 10 and each of other solutions than TOG shown in the Table 5 under an inert atmosphere. Then, the temperature region in which the other solutions than TOG shown in the Table 5 undergo a reduction reaction is determined based on the results of the differential thermal analysis. Then, the carbon film 41 is heated to a temperature within the range of the temperature region measured under an inert atmosphere.

With the surface treatment methods of from the first embodiment to the fourth embodiment, only by heating the base materials 10, 20, 30, and 40 in the furnace, it is possible to form the coating films 12, 23, 33, and 42, respectively. Namely, with the surface treatment methods of from the first embodiment to the fourth embodiment, it is not necessary to put the base materials 10, 20, 30, and 40 in the container storing molten metal as in the related-art technology. Therefore, with the surface treatment methods of from the first embodiment to the fourth embodiment, the molten metal is not deposited on the base materials 10, 20, 30, and 40 after heating. For this reason, it is possible to form the coating films 12, 23, 33, and 42 with ease.

Further, the surface treatment methods of from the first embodiment to the fourth embodiment can be carried out with ease, because readily-accessible titanium or the like are used.

Herein, onto a mold for use in gravity casting, low pressure die casting, or the like, a coating agent is applied before casting for the purpose of facilitating removal of a product from the mold, and other purposes. As the raw materials for such a coating agent, there are used graphite and the like good in fluidity for molten metal.

As described above, when the coating films 12, 23, 33, and 42 are formed using the surface treatment methods of from the first embodiment to the fourth embodiment, respectively, it is possible to largely improve the fluidity for molten aluminum.

For this reason, it is acceptable that the coating agent is manufactured using each powder of the coating films 12, 23, 33, and 42 formed using the surface treatment methods of from the first embodiment to the fourth embodiment, respectively, as the raw material. In this case, for example, each of the coating films 12, 23, 33, and 42 is cut from the base material 10, and is processed into a powder form. Then, each powder of the coating films 12, 23, 33, and 42 is dispersed in water or the like.

Such a coating agent is formed of the coating film 12, 23, 33, or 42 having good fluidity for molten aluminum. This can facilitate removal of a product from the mold, and can elongate the life of the mold.

The coating films 12, 23, and 33 formed using the surface treatment methods of from the first embodiment to the third embodiment are each better in fluidity for molten aluminum than the coating film 42 formed using the surface treatment method of the fourth embodiment. For this reason, for the raw materials for the coating agent, there may be used the powders of the coating films 12, 23, and 33 formed using surface treatment methods of from the first embodiment to the third embodiment, respectively.

Incidentally, in from the first embodiment to the fourth embodiment, each base material was a mold for casting, but the invention is not limited thereto. Further, the base material is not necessarily required to be formed of iron.

In from the first embodiment to the fourth embodiment, it is acceptable that the base material is surface coated with a carbon film or a nitrogen film by any means. Therefore, it is acceptable that the base material is surface coated with a carbon film or a nitrogen film by, for example, a vacuum deposition treatment.

In from the first embodiment to the fourth embodiment, the coating film was cooled to 200° C., but the invention is not limited thereto. Namely, cooling may be desirably performed to a temperature enough to allow suppression of oxidation of the coating film. Specifically, the coating film may be desirably cooled to 200° C. or less under an inert atmosphere. Further, from the viewpoint of being capable of more suppressing oxidation of the coating film, the coating film may also be cooled to 100° C. or less under an inert atmosphere.

In from the first embodiment to the fourth embodiment, ultrasonic cleaning was performed in the furnace under an inert atmosphere, but the invention is not limited thereto. Namely, it is also acceptable that ultrasonic cleaning is performed under an air atmosphere.

Further, for manufacturing of the coating agent, the coating film rendered in a powder form was used as the raw material, but the invention is not limited thereto. Namely, such a manufacturing method as to suppress the components of the coating film from altering in quality may be desirably used so that the coating agent contains the components of the coating film.

The invention claimed is:

1. A surface treatment method, comprising:
   supplying at least one metal selected from the group consisting of titanium, zirconium, niobium, vanadium, hafnium, tantalum, and tungsten to an amorphous carbon film present on a base material; and then
   heating the carbon film to 400° C. or more under an inert atmosphere, thereby forming a coating film on the base material,
   cooling the coating film to 200° C. or less under an inert atmosphere, after forming the coating film, then
   cleaning the coating film with ultrasonic wave in an oil,
   wherein the coating film comprises at least a portion of the amorphous carbon film and at least a portion of the carbon atoms in the amorphous carbon film are bonded to the metal with a carbon-metal bond.

2. The surface treatment method according to claim 1, wherein the supplying forms a layer of the metal on the amorphous carbon film,
   wherein the heating causes at least a portion of the metal to form the metal-carbon bond in the amorphous carbon film, wherein the heating further forms a first carbon film region adjacent to the base material, a second carbon film region adjacent to the first carbon film region and a metal film region, and
   wherein the cleaning removes the second carbon film region and the metal film region.

3. The surface treatment method according to claim 1, wherein the metal is supplied as a metal compound.

4. A surface treatment method, comprising:
   supplying at least one metal selected from the group consisting of titanium, zirconium, and niobium to an amorphous carbon film, wherein the carbon film is present on a nitride film and the nitride film is present on a base material; and then
   heating the carbon film to 400° C. or more under an inert atmosphere, thereby forming a coating film on the base material,
   cooling the coating film to 200° C. or less under an inert atmosphere, after forming the coating film, then
   cleaning the coating film with ultrasonic wave in an oil,
   wherein the coating film comprises at least a portion of the amorphous carbon film and at least a portion of the carbon atoms in the amorphous carbon film are bonded to the metal with a carbon-metal bond.

5. The surface treatment method according to claim 4, wherein the supplying forms a layer of the metal on the amorphous carbon film,
   wherein the heating causes at least a portion of the metal to form the metal-carbon bond in the amorphous carbon film, wherein the heating further forms a first carbon film region adjacent to the nitride film, a second carbon film region adjacent to the first carbon film region and a metal film region, and
   wherein the cleaning removes the second carbon film region and the metal film region.

6. The surface treatment method according to claim 4, wherein the metal is supplied as a metal compound.

7. A surface treatment method, comprising:
   supplying at least one metal selected from the group consisting of titanium, zirconium, and niobium to a nitride film, wherein the nitride film is present as a topmost surface side on a base material; and
   heating the nitride film to 400° C. or more under an inert atmosphere, thereby forming a coating film on the base material,
   cooling the coating film to 200° C. or less under an inert atmosphere, after forming the coating film, then
   cleaning the coating film with ultrasonic wave in an oil,
   wherein the coating film comprises at least a portion of the nitride film and at least a portion of the nitrogen atoms in the nitride film are bonded to the metal with a nitrogen-metal bond to the metal supplied on the base material.

8. The surface treatment method according to claim 7, wherein the supplying forms a layer of the metal on the nitride film,
   wherein the heating causes at least a portion of the metal to form the metal-nitrogen bond in the nitride film, wherein the heating further forms a first nitride film region adjacent to the nitrogen film, a second nitride film region adjacent to the first nitride film region and a metal film region, and wherein the cleaning removes the second nitride film region and the metal film region.

9. The surface treatment method according to claim 7, wherein the metal is supplied as a metal compound.

10. A surface treatment method, comprising:
supplying a titanium containing solution to an amorphous carbon film, wherein the amorphous carbon film is as a topmost surface side on a base material and the amorphous carbon film; and then
heating the amorphous carbon film to a temperature for allowing the solution to undergo a reduction reaction under an inert atmosphere, thereby forming a coating film on the base material,
cooling the coating film to 200° C. or less under an inert atmosphere, after forming the coating film, then
cleaning the coating film with ultrasonic wave in an oil,
wherein the coating film comprises at least a portion of the amorphous carbon film and at least a portion of the carbon atoms in the amorphous carbon film are bonded to the metal with a carbon-metal bond.

11. The surface treatment method according to claim 10, further comprising:
performing a differential thermal analysis on a mixture of the amorphous carbon film before heating the titanium-containing solution under an inert atmosphere; and
determining a temperature region for allowing the titanium-containing solution to undergo a reduction reaction based on results of the differential thermal analysis,
wherein the temperature for allowing the titanium-containing solution to undergo a reduction reaction under the inert atmosphere is a temperature within a range of the determined temperature region.

* * * * *